Feb. 22, 1955 H. GOLLE ET AL 2,702,834

DRIVING MECHANISM FOR TAPE-SHAPED SOUND RECORD CARRIERS

Filed April 20, 1951 2 Sheets-Sheet 1

Inventor:

Horst Golle

Hermann Bischkopf

Feb. 22, 1955 H. GOLLE ET AL 2,702,834

DRIVING MECHANISM FOR TAPE-SHAPED SOUND RECORD CARRIERS

Filed April 20, 1951 2 Sheets-Sheet 2

Inventor:
Horst Golle
Hermann Bischkopf

United States Patent Office 2,702,834

Patented Feb. 22, 1955

2,702,834

DRIVING MECHANISM FOR TAPE-SHAPED SOUND RECORD CARRIERS

Horst Golle, Berlin-Steglitz, and Hermann Bischkopf, Berlin-Blankenburg, Germany, assignors to Loewe Opta A. G., Berlin-Steglitz, Germany, a company of Germany Application April 20, 1951, Serial No. 221,977

7 Claims. (Cl. 179—100.2)

The devices known heretofore for sound recording or reproducing on tape- or wire-shaped record carriers, especially those for magnetic sound recording, require the manual inserting of the tape or the wire, before starting their operation, into the guide pulleys of the drive and their feeding to the magnetic head or heads. These manipulations require much time and some practice.

The present invention removes these shortcomings. According to this invention, the sound record carrier is switched into its working position by mechanical means, when attaching the supply reel or reels to the driving gear, without requiring any manual inserting of the tape. For this purpose, the two supply reels for the magnetic tape are suitably housed in a common magazine which is to be attached to the driving gear. Hereat, the magnetic tape which is arranged inside the magazine in its "off"-position (rest position) is brought into its "working" position either by manual means, e. g. a lever, or automatically by a device actuated by the attaching of the magazine to the driving gear.

Besides that, the new device is fitted with means providing for the drive of the tape reel housed inside the magazine by means of the driving gear, e. g. by friction discs coupled with the driving motor, furthermore with means for centering the record carrier reels when attaching the magazine to the driving gear, means for keeping unchanged the length of the free path of the record carrier when switching it over from its "off"-position to the "working"- or "on"-position, and means for pressing the sound record carrier, at its first direction of travel, to one side of the magnet head (or heads), at the other direction of tape travel, however, to its (or their) other side.

Figure 1:
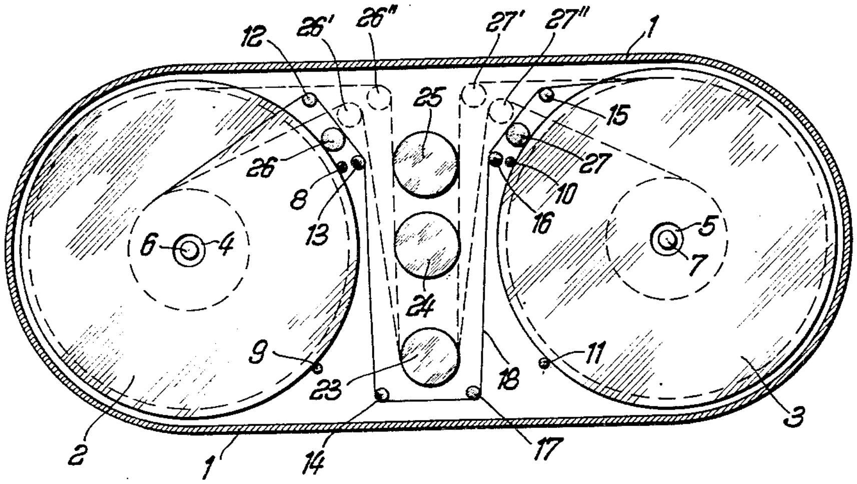
Figure 2:
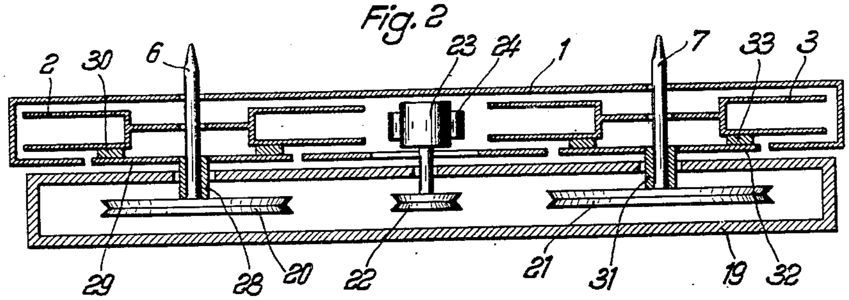
Figure 3:
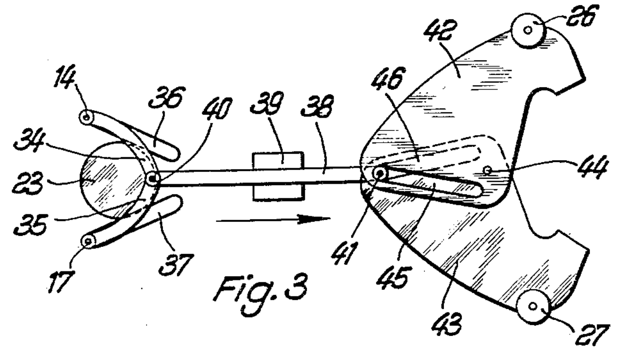

The principle of this invention can be recognized in detail by the accompanying drawing which at the same time, omitting all members not necessary for understanding the invention, is to be regarded only as an example of one embodiment of the invention. Figs. 1 and 2 show a top view and a side view of the device, whereas Fig. 3 shows, as a detail sketch, the control mechanism for the movement of the guide pulleys switching the tape from the "off"-position over to the working position and vice versa.

According to Figs. 1 and 2 the sound record carrier is housed inside a magazine 1 of, for instance, oval form housing the reels 2 and 3. Each of these reels has in its center one hole 4 respectively 5 into which the driving pins are entering, when the magazine is being attached to the driving gear, in such a way that they are centering the two tape reels without, however, being in full gear with them. For keeping the two reels 2 and 3 in that position in which they were taken away from the driving gear, several small pins or plates 8 and 9, respectively 10 and 11 are provided inside the magazine which come into contact with the outside periphery of the reels 2 respectively 3. For guiding the tape-shaped record carrier in its "off"-position several small pins or rollers are provided inside the magazine: near reel 2 the pins 12, 13, and 14, and near reel 3 the pins 15, 16, and 17. By these pins the sound record carrier 18 is guided so that its path resembles a U.

The driving gear to which the magazine is attached in its "working" position is represented in a simplified manner—see, in particular, Fig. 2—by a casing 19 in which the pulleys 20 and 21 for driving the reels and pulley 22 for driving the tape are arranged. The three pulleys 20, 21, and 22 are coupled, for instance by a cord drive, with the driving motor which, for clarity's sake, was omitted in the drawing. On pulley 22, which is suitably arranged in the center plane of the magazine, driving shaft 23 is mounted imparting the necessary velocity of travel to the sound record carrier 18 which in its "working" position is closely embracing it. In the center-plane of the magazine are mounted, too, the two magnet heads 24 and 25 the first of which is operating, for instance, as reproducing head, the second as erasing (obliterating) head.

In order to switch-over the sound record carrier from the position traced in full lines ("off" position) automatically into the "working position, two further pulleys 26 respectively 27 are provided at the driving gear which, up to the attachment of the magazine, are arranged in the position shown in Fig. 1. If the magazine is being attached to the driving gear, these two pulleys will be mutually approaching in consequence of the device shown in Fig. 3, whereby they will come either into the positions 26′ and 27′ (broken lines) or 26″ and 27″ (dotted lines). In case of position 26′, 27′ the sound record carrier which in this case is, too, traced as a broken line is guided by pulley 26′, driving shaft 23, past the right side of the magnet heads 24 and 25, and, across pulley 27′, to the wind-off reel 3. For the opposite direction of travel the sound record carrier, traced in dotted lines, is guided from reel 3, which in this case acts as wind-up reel, across pulley 27″, driving shaft 23, past the left side of the two magnet heads 24 and 25, across pulley 26′ to the reel 2 acting as wind-off reel. The movement of the transport pulleys 26 and 27 into their working positions 26′, 27′ respectively 26″, 27″ is accomplished by means which are not shown in the drawing, for instance by actuating, after winding off one reel, a contact in consequence of the increasing tape traction which electrically effects the movement of the carriers with the pulleys 26 and 27 and, simultaneously, the reversing of the direction of tape travel.

Simultaneously with the shifting of the pulleys 26 and 27 from their "off" position into one of their two working positions is accomplished a motion of the pins or rollers 14 and 17, provided in the magazine for the "off" position, in such a way that, also by means of the device shown in detail by Fig. 3, these two rollers 14 and 17 are moved in the direction towards the tape driving shaft 23 so that the path of the tape 18, which in the "off" position had the form of a U, now approximately corresponds to a V at the base of which is situated the shaft 23. The relation of the "off" and "working" positions of the pulleys 26, 27, and 23 on the one hand as well as of the rollers or pins 12 to 17 on the other hand was chosen so that the length of the "free" path between the two reels in the operational or "working" position remains practically the same as in the "off" or rest position.

The drive of the reels 2 and 3 will be accomplished, for instance, by friction discs 29 respectively 32 connected by sleeves 28 respectively 31 with the driving pulleys 20 respectively 21. The elastic preferably ring-shaped linings 30 respectively 33 on these friction discs consist, for instance, of felt, leather, or the like and are acting directly to the side walls of the reels 2 respectively 3 which are in contact with these auxiliary rings. Hereat, the sleeves 28 respectively 31 are fixed at the pins 6 respectively 7 which must have such a play in the central openings 4 respectively 5 of the tape reels that they are only centered in them but do not, when rotating, drive the reels. The bottom of the magazine is provided with suitable openings at those places at which the driving and guiding members of the driving gear are located, as for instance, the friction discs 29 and 32, shaft 23, pulleys 26 and 27 as well as, lastly, the magnet heads.

The shifting mechanism for switching the sound record carrier from its "off" position automatically over into one of the two "working" positions is shown in Fig. 3 in a simplified manner, too, i. e. omitting especially the pivoting device of the pulleys 26 and 27 for the switching-over between the two working positions. As shown in this drawing, the pins 14 and 17 holding the sound record carrier in its "off" position are fastened each at one end of the slightly curved legs 34 respectively 35. At the other end of these two legs a pin 40 is mounted which passes through openings at the end of the two legs and is fixed at a control rod 38 moving in a guide block 39. The other end of this control rod, opposite to pin 40, carries a pin 41 sliding simultaneously in two guide slits 45 respectively 46 which belong each to one carrier 42 respectively 43, pivoting in a link motion around center 44 and carrying at their winged ends the pulleys 26 and 27. In order to switch the sound record carrier from its "off" position shown in Fig. 3 to the "working" position, the control rod 38 is moved in the direction of the arrow-head, either by a special manually operated lever or, eventually, automatically when attaching the magazine to the driving gear. Hereat, on the one hand the pins 14 and 17 are drawn, too, in the direction of the arrow-head whereby the sound record carrier (see Fig. 1) comes into close contact with driving shaft 23 and, on the other hand, pin 41, sliding in the guide slits 45 and 46, will accomplish a pivotal movement of the carriers 42 and 43 around their pivoting center 44 in such a way that their outside ends, carrying the pulleys 26 and 27, will mutually approach, whereby one of the "working" positions 26', 27' or 26'', 27'' will be accomplished as shown in Fig. 1.

A further improvement of this invention substantially consists in that, referring to Fig. 3, the sliding member for accomplishing the scissorlike movement of the guide pulleys for the sound record carrier is designed as a catch which, in the working position, prevents the removal of the magazine. In the "off" position in which, as shown particularly in Fig. 1, the sound record carrier is no more in contact with the sound pulley and with the magnet heads, the catch releases the magazine which thereby can be lifted and exchanged.

Another embodiment of the principle of the present invention consists in fixing the position of the sound record carrier reels, as soon as the sound record carrier has been switched into its "off" position, in such a way that the supply reels for the sound record carrier cannot rotate when the magazine is being exchanged. Finally, this invention relates to means rendering possible the exact centering of the magazine when attaching it at the casing of the driving gear so that the driving pins for the supply reels will exactly fit into the holes provided for them.

Figure 4:
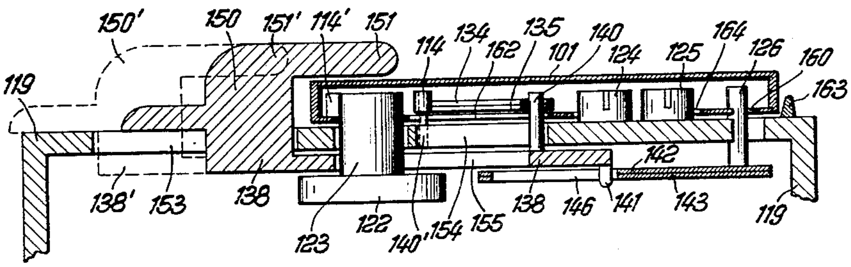
Figure 5:
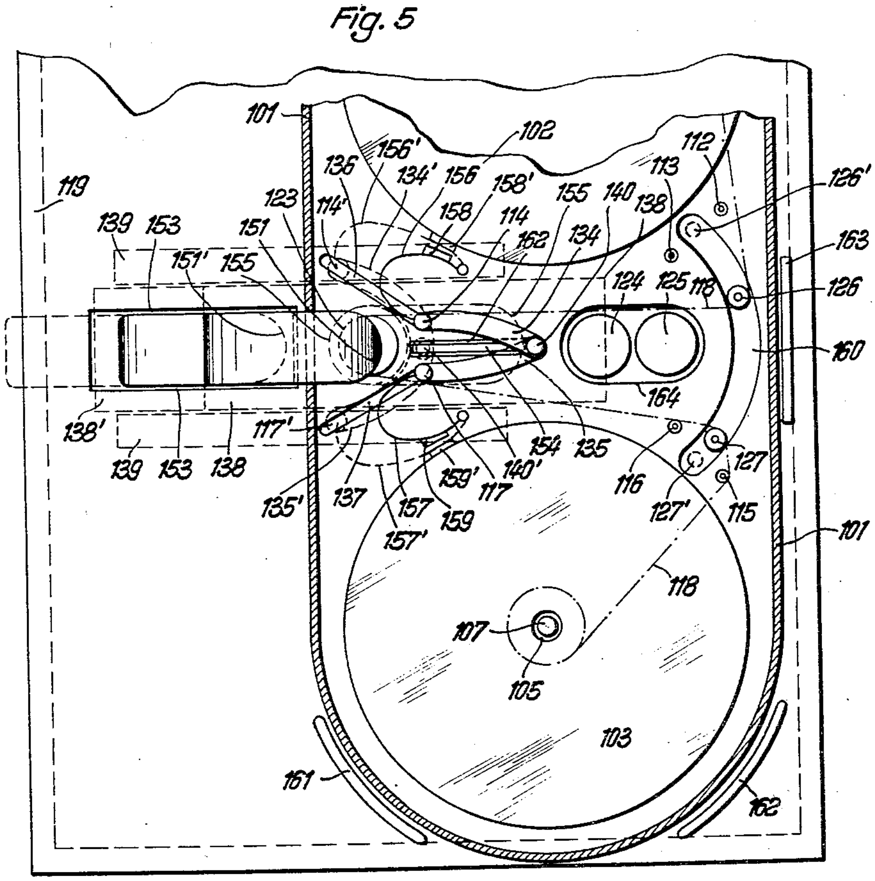

The principle of these measures is shown in detail by the annexed drawings representing an example of their realization. Fig. 4 shows a cross section of the whole assembly along the shorter axis of the oval-shaped magazine. Fig. 5 shows a top view of the assembly. In both drawings only those members are shown which are indispensable for understanding the invention; particularly the driving motor and the drive members connected with it have been omitted in either drawing.

In Fig. 4 of the present drawing the upper part of the casing of the driving gear 119 is shown with the magazine attached to it and with the adjusting device as well as the fixing catch. In Fig. 5 the magazine cover has been removed. The members which correspond, in particular, to those of Fig. 3 and which are shown in these drawings in a somewhat modified form, are principally the control rod 138 guided by the carriage guide 139 and fitted with two pins 140 respectively 141. Of these, pin 140 is provided for moving the levers 134 and 135 belonging to the magazine, which carry at their ends the guide rollers 114 and 117 (cf. particularly Fig. 1 and Fig. 3) and which are guided by the guide slits 136 and 137. Pin 141 of the control rod 138 serves, as in Fig. 1 and Fig. 3, for bringing the guide pulleys 126 and 127, which belong to the driving gear and which are arranged quite near the supply reels, either into their far-apart position ("off"-position) or into their position of near approach ("working"-position). Differently from Fig. 1, in the drawings Fig. 5 and Fig. 4 the adjusting device is shown traced in full lines for the "working" or operational position, whereas the dotted lines refer to the rest or "off" position.

Furthermore, in Figs. 4 and 5 the oval magazine is designated with 101, in which the two supply reels 102 and 103 are housed. The detailed drawing of reel 103 shows its axial hole 105 through which pin 107 enters if the magazine is being attached to the casing 119 of the driving gear, pin 107 being connected with the corresponding driving pulley of the driving gear (not shown in the drawing). Between the two reels 102 and 103 are arranged—by some known method—the magnet heads 124 and 125 in such a way that the magnetic tape 118 is drawn either past one or past the other side of these magnet heads, according to the position of the pivoting guide pulleys 126 and 127. The tape driving pulley—the so-called "sound pulley"—is designated with 123, its driving pulley with 122.

The control rod 138 mounted below the casing wall 119 is provided with an adjusting lever 150 which projects above the top cover plate of the casing of the driving gear 119 and which is connected with rod 138, passing through a slit 153 of this cover plate. Lever-handle 150 is fitted, on that side turned towards the magazine, with an extension piece 151 shaped like a catch which, as shown particularly in Fig. 4, in its working position is located above the magazine 101, thereby locking it in this position. The sides of lever-handle 150 are either grooved or bored through for ensuring a firm grip. The control rod 138 is provided with a slit 155 surrounding the sound pulley 123 so that it can freely be moved to and fro. Pin 140 at which the levers 134 and 135 for the tape guiding pulleys are fastened projects into a hole bored into the end (in the drawing the right end) of each of the levers 134 and 135. Hereat, pin 140 passes through slit 154 in the top cover plate of the casing of the driving gear 119 and, above that, through slit 162 in the base plate of the magazine 101. The left ends of the levers 134 and 135 are each connected with a spring 156 respectively 157 which, bent like a U, are attached each at one fixed point 165 respectively 166 of the magazine casing. Each of these two springs is fitted with a brake lining 158 respectively 159 which, in the working position, are at some distance from the outside walls of the supply reels 102 respectively 103, in the "off" position, however, the brake linings are in close contact with the periphery of the reels so that the latter cannot be unintentionally moved when detaching the magazine and the position of the sound record carrier 118 remains unchanged. For the removal of magazine 101 from the casing of the driving gear in upward direction are furthermore provided in the base plate of the magazine: one slit 160 along which the guide pulleys 126 respectively 127 connected with the driving gear can shift at their pivoting respectively swinging movement as well as another perforation 164 surrounding the magnet heads 124 and 125 which likewise are fastened at the casing of the driving gear.

By simply shifting the handle 150 the assembly is switched-over either into its working position—traced in full lines—whereby the path of the sound record carrier tape 118 is from reel 102 along pulley 126, past the magnet heads 124 and 125 to the "sound pulley" 123, along pulley 127 to reel 103. In this working position the pin 140 of the control rod 138 is in its right terminal position holding the levers 134 and 135 in their position of near approach whereat the rollers 114 and 117 mounted at the left ends of these levers are located behind the straight line between sound pulley 123 and the magnet heads 124 and 125, thus being out of contact with the sound record carrier tape 118. In the same position, also the guide pulleys 126 and 127, which are arranged near the reels, are in their position of near approach so that tape 118 has, for instance, the working position designated by the line marked with dashes and dots. In the same position, the springs attached to the left ends of the levers 134 and 135 are in their position 156 respectively 157 whereat the brake shoe linings 158 respectively 159 are not in contact with the supply reels 102 respectively 103 so that the latter can be freely moved by the driving gear.

If the assembly shall be switched over from the working position to the "off" position and the magazine shall be removed, the handle 150 is drawn back from the magazine—in the drawing to the left—till the handle and the members connected with it: rod 138, pins 140 and 141 etc. have reached the position shown by the dotted lines. At this position, piece 151 of the handle 150, serving as a catch bar, is first of all moved as far as to give free the magazine which now can be lifted and removed. At the same time, pin 140 is moved by means of slits 154 respectively 162 into the left position 140' whereat the levers 134, 135, the left ends of which are guided by the straight slits 136 and 137, are moved into the position 134', 135' and the guide rollers 114, 117 into the position 114' respectively 117'. Hereby, the sound record carrier tape 118 is lifted from the sound pulley 123. At the same time, also the guide pulleys 126 and 127 are brought into their wide-apart position by means of the link arrangement 143, 144 shown in Fig. 3 whereby they are moved behind the straight line between the pins 112, 113 respectively 115, 116 fixed inside the magazine. Tape 118 is guided, in this "off" position, from reel 102 along the guide pins 112 and 113, the guide rollers 114' and 117', and the pins 116 and 115 to the reel 103, and thus is separated from all those parts belonging to the casing of the driving gear. Simultaneously, in this "off" position the springs 156, 157 come into the position 156' respectively 157' in which the brake shoes 158 respectively 159 enter into contact with the reels 102 respectively 103. Now, the magazine can be removed by lifting it upwards.

If the magazine shall be once more attached, the adjusting handle 150 must at first be in the dotted position; then, the magazine will be attached in such a way that the guide rollers 126 and 127 enter into the slit 160, and the magnet heads 124, 125 into the slit 164, thus projecting into the magazine whereas pin 140 in the position 140' enters into the holes of the guide levers 134 and 135, the axle pins for the reels 102 and 103 fitting into the corresponding axle holes in these reels. Now, the handle 150 is moved towards the magazine till it is again in the position traced in full lines whereby tape 118 comes into its working position designated by the dash and dot lines.

In order to facilitate the exact attaching of the magazine, several centering guides 161, 162, and 163 are provided on the top plate of the casing 119 of the driving gear.

For keeping the drawings clear, those parts of the driving gear have been omitted which have to adjust the path of the tape to its direction of travel and which are not within the range of the present patent. These members for which a patent application has been submitted formerly, consist in a pivoting disc ("dancing pulley") which, according to the sense of rotation of the driving motor, is pressed either to that pulley which drives reel 102 or to that of reel 103, thereby effecting the rotation of the corresponding reel. Simultaneously with this movement a common pivoting motion of the guide pulleys 126 and 127 takes place without, however, changing the distance between them whereby, in the first case, the tape's path corresponds to Fig. 5 whereas in the other position (not shown in the drawing) the tape is drawn past the lower gaps of the magnet heads 124, 125 while it is lifted off from the upper gaps of these magnet heads.

We claim:

1. A magnetic sound recording and reproducing device with a magazine adapted to be mounted on an upper service plate of said device, said magazine containing two sound carrier reels and fixed and movable guiding rollers holding the sound carrier stretched in its rest position between said reels in a somewhat U-shaped form, reel spindles, magnetic heads, a tape driving pulley and means for moving said movable guiding rollers being arranged on said upper service plate such as to project into said magazine through corresponding openings provided in its bottom wall when mounting said magazine on said service plate, whereby said driving pulley is positioned near the vertex of said U-guided sound carrier and said heads are positioned between the sides of said U-guided sound carrier, said guiding rollers of the magazine being movable into the space between said driving pulley and said magnetic heads, thereby bringing said sound carrier into its working position embracing said driving pulley.

2. A magnetic sound recording and reproducing device with a magazine adapted to be mounted on an upper service plate of said device, said magazine containing two sound carrier reels and fixed and movable guiding rollers holding the sound carrier stretched in its rest position between said reels in a somewhat U-shaped form, reel spindles, magnetic heads, a tape driving pulley and means for moving said movable guiding rollers being arranged on said upper service plate such as to project into said magazine through corresponding openings provided in its bottom wall when mounting said magazine on said service plate, whereby said driving pulley is positioned near the vertex of said U-guided sound carrier and said heads are positioned between the sides of said U-guided sound carrier, said guiding rollers of the magazine being movable into the space between said driving pulley and said magnetic heads, thereby bringing said sound carrier into its working position embracing said driving pulley, two additional guiding rollers being mounted on said upper service plate of the device such as to project into the magazine when mounting said magazine on said service plate, and being movable in such a manner as to approximate to each other, thereby removing said sound carrier from its rest guiding means fixed in the magazine and alternately bringing said carrier into contact with one of the two lateral gaps of the magnet heads.

3. A magnetic sound recording and reproducing device with a magazine adapted to be mounted on an upper service plate of said device, said magazine containing two sound carrier reels and fixed and movable guiding rollers holding the sound carrier stretched in its rest position between said reels in a somewhat U-shaped form, reel spindles, magnetic heads, a tape driving pulley and means for moving said movable guiding rollers being arranged on said upper service plate such as to project into said magazine through corresponding openings provided in its bottom wall when mounting said magazine on said service plate, whereby said driving pulley is positioned near the vertex of said U-guided sound carrier and said heads are positioned between the sides of said U-guided sound carrier, said guiding rollers of the magazine being movable into the space between said driving pulley and said magnetic heads, thereby bringing said sound carrier into its working position embracing said driving pulley, said additional guiding rollers of the device and said movable means for moving the movable guiding rollers of said magazine being mounted on legs arranged on a hand-moved slidable rod in scissor-like manner.

4. A magnetic sound recording and reproducing device with a magazine adapted to be mounted on an upper service plate of said device, said magazine containing two sound carrier reels and fixed and movable guiding rollers holding the sound carrier stretched in its rest position between said reels in a somewhat U-shaped form, reel spindles, magnetic heads, a tape driving pulley and means for moving said movable guiding rollers being arranged on said upper service plate such as to project into said magazine through corresponding openings provided in its bottom wall when mounting said magazine on said service plate, whereby said driving pulley is positioned near the vertex of said U-guided sound carrier and said heads are positioned between the sides of said U-guided sound carrier, said guiding rollers of the magazine being movable into the space between said driving pulley and said magnetic heads, thereby bringing said sound carrier into its working position embracing said driving pulley, said additional guiding rollers of the device and said movable means for moving the movable guiding rollers of said magazine being mounted on legs arranged on a hand-moved slidable rod in scissor-like manner, said slidable rod being provided with a catch preventing a removal of the magazine in the working position of the sound carrier.

5. A magnetic sound recording and reproducing device with a magazine adapted to be mounted on an upper service plate of said device, said magazine containing two sound carrier reels and fixed and movable guiding rollers holding the sound carrier stretched in its rest position between said reels in a somewhat U-shaped form, reel spindles, magnetic heads, a tape driving pulley and means for moving said movable guiding rollers being arranged on said upper service plate such as to project into said magazine through corresponding openings provided in its bottom wall when mounting said magazine on said service plate, whereby said driving pulley is positioned near the vertex of said U-guided sound carrier and said heads are positioned between the sides of said U-guided sound carrier, said guiding rollers of the magazine being movable into the space between said driving pulley and said magnetic heads, thereby bringing said sound carrier into its working position embracing said driving pulley, said additional guiding rollers of the device and said movable means for moving the movable guiding rollers of said magazine being mounted on legs arranged on a hand-moved slidable rod in scissor-like manner, said slidable rod being provided with two pins, one of which projects into a common hole of said two legs carrying said movable guiding rollers of said magazine, the other pin projecting into slits provided in scissorlike carriers pivotally mounted and containing said additional guiding rollers removing said sound carrier from its rest guiding means.

6. A magnetic sound recording and reproducing device with a magazine adapted to be mounted on an upper service plate of said device, said magazine containing two sound carrier reels and fixed and movable guiding rollers holding the sound carrier stretched in its rest position between said reels in a somewhat U-shaped form, reel spindles, magnetic heads, a tape driving pulley and means for moving said movable guiding rollers being arranged on said upper service plate such as to project into said magazine through corresponding openings provided in its bottom wall when mounting said magazine on said service plate, whereby said driving pulley is positioned near the vertex of said U-guided sound carrier and said heads are positioned between the sides of said U-guided sound carrier, said guiding rollers of the magazine being movable into the space between said driving pulley and said magnetic heads, thereby bringing said sound carrier into its working position embracing said driving pulley, each of said guiding rollers of said magazine being connected with a brake shoe adapted to be pressed towards the periphery of said sound carrier reels in the rest position.

7. A magnetic sound recording and reproducing device with a magazine adapted to be mounted on an upper service plate of said device, said magazine containing two sound carrier reels and fixed and movable guiding rollers holding the sound carrier stretched in its rest position between said reels in a somewhat U-shaped form, reel spindles, magnetic heads, a tape driving pulley and means for moving said movable guiding rollers being arranged on said upper service plate such as to project into said magazine through corresponding openings provided in its bottom wall when mounting said magazine on said service plate, whereby said driving pulley is positioned near the vertex of said U-guided sound carrier and said heads are positioned between the sides of said U-guided sound carrier, said guiding rollers of the magazine being movable into the space between said driving pulley and said magnetic heads, thereby bringing said sound carrier into its working position embracing said driving pulley, said sound carrier being of tape-shaped form.

References Cited in the file of this patent

UNITED STATES PATENTS

| | | |
|---|---|---|
| 1,713,503 | Von Madaler | May 14, 1929 |
| 1,782,529 | De Vinna | Nov. 25, 1930 |
| 2,082,232 | Traenkle | June 1, 1937 |
| 2,106,374 | Goldhammer et al. | Jan. 25, 1938 |
| 2,451,782 | Stevens | Oct. 19, 1948 |
| 2,468,198 | Heller | Apr. 26, 1949 |
| 2,535,486 | Dank | Dec. 26, 1950 |
| 2,524,064 | Masterson | Oct. 3, 1950 |
| 2,601,955 | Hardenberg | July 1, 1952 |